United States Patent [19]

Evans et al.

[11] Patent Number: 4,558,107

[45] Date of Patent: Dec. 10, 1985

[54] AROMATIC HIGH SOFTENING POINT PETROLEUM RESINS AND PROCESS FOR ITS PREPARATION

[75] Inventors: Morris L. Evans; Augustus B. Small, both of Baton Rouge, La.

[73] Assignee: Exxon Research & Engineering Co., Florham Park, N.J.

[21] Appl. No.: 601,024

[22] Filed: Apr. 16, 1984

Related U.S. Application Data

[63] Continuation of Ser. No. 387,342, Jun. 11, 1982, abandoned.

[51] Int. Cl.$^4$ ............................................ C08F 240/00
[52] U.S. Cl. ..................................... 526/237; 526/76; 526/280; 526/283; 526/290
[58] Field of Search ................ 526/76, 280, 283, 290, 526/237

[56] References Cited

U.S. PATENT DOCUMENTS 2,770,614 11/1956 Howarth et al. ................... 526/280
2,856,389 10/1958 Fusco et al. ......................... 526/280
3,927,144 12/1975 Hayashi et al. ..................... 526/283

Primary Examiner—Harry Wong, Jr.
Attorney, Agent, or Firm—R. A. Dexter

[57] ABSTRACT

High softening point, i.e. greater than 140° C., aromatic petroleum resins are prepared by polymerizing with an AlCl$_3$ catalyst an unsaturated hydrocarbon mixture of one part of (1) a feedstock fraction obtained from the thermal cracking of petroleum boiling in the range of 135°–220° C. and principally composed of aromatic substituted olefins, e.g. styrene and its derivatives and indenes and its derivatives and from 0.3 to 1 part by weight of (2) oligomers of cyclopentadiene.

7 Claims, No Drawings

AROMATIC HIGH SOFTENING POINT PETROLEUM RESINS AND PROCESS FOR ITS PREPARATION

This is a continuation of application Ser. No. 387,342 filed June 11, 1982 (now abandoned).

This invention relates to hydrocarbon resins and processes for their preparation. More particularly, the invention relates to high softening point hydrocarbon resins prepared by polymerizing a mixture of a hydrocarbon fraction comprised of aromatic olefins and oligomers of cyclopentadienes by means of aluminum chloride catalyst. The polymerized resin is then quenched, washed to remove catalyst residues and finished to provide high softening point hydrocarbon resins.

BACKGROUND OF THE INVENTION

Hydrocarbon resins can be produced from certain petroleum refinery streams containing mixtures of olefins and diolefins by polymerization using Friedel-Crafts catalysts. The steam cracked streams have been found especially useful for this purpose. For example, heavier petroleum fractions such as naphtha, gas oil, and the like, are steam cracked and the gas and liquid streams so produced contain large quantities of diolefins and olefins in the $C_5$ and $C_{10}$ range. The naphtha distillate streams obtained by steam cracking operations, boiling in the range of 30° to 300° C., contain large amounts of diolefins, olefins and aromatics. The resins produced from these streams generally have softening points much lower than desired for certain applications, such as, for example, offset ink printing which requires softening points of about 140° C.

The manufacture of hydrocarbon resins having a softening point of 140° C. or above is disclosed in several U.S. Patents including U.S. Pat. No. 2,753,326 (Aug. 3, 1958). In the process, a thermal cracked petroleum fraction with boiling range of 80°–280° F. is heat treated at 300° F. to dimerize, and this dimerized fraction is treated at 400°–700° F. to decompose cyclic diolefin dimer into monomer, while the aliphatic diolefin dimer fraction is not cracked and is polymerized using a Friedel-Crafts catalyst. According to the examples of the reference, the resins obtained are such that the maximum softening point is 160° C.

In U.S. Pat. No. 3,753,963, resins having softening points of 115° to 158° C. are reported as being prepared from a feedstock comprised of styrene and its derivatives, and indene and its derivatives. To prepare the high softening point resin, (i.e. about 140° C.) the styrene content is adjusted to below 7 wt. percent and the total content of indene and its alkyl derivatives is adjusted to above 5 wt. percent. Phenols and alkylphenols are added to the feed at 0.5 to 5 wt. percent and the polymerization is conducted using boron trifluoride type catalyst such as gaseous boron trifluoride or complexes of boron trifluoride. Other approaches to the preparation of such high softening point petroleum resins include: thermally polymerizing cyclic diolefins such as cyclopentadiene or blends of these cyclic diolefins with aliphatic and/or aromatic substituted olefins and diolefins, such as 1,3-pentadiene or styrene; and, polymerizing aromatic substitutued olefins such as blends of styrene, α-methyl styrene, vinyl toluene, indene and methyl indenes, using a Friedel-Crafts catalyst such as $BF_3$. Unfortunately, the polymerization of such an aromatic substituted olefinic feed in a continuous reactor using $AlCl_3$ as the catalyst, does not yield a resin having a softening point as high as 140° C., i.e. the softening point is about 125° to 130° C.

STATEMENT OF THE INVENTION

It has been discovered that petroleum resins having a softening point of at least 140° C. can be produced in a continuous polymerization by means of an aluminum chloride catalyst when the polymerization mixture is composed of about 0.4 parts by weight of cyclopentadiene oligomers and one part by weight of an aromatic olefinic fraction having a boiling range of from 135° to 220° C.:

Therefore, in accordance with this invention there is realized a high softening point petroleum resin prepared by a process which comprises polymerizing in the presence of at least a catalytic amount of aluminum chloride an unsaturated hydrocarbon mixture of one part by weight of (1) an aromatic substituted olefinic feedstock having a boiling range of from 135° to 220° C. and composed essentially of styrene and its derivatives and indene and its derivatives and from 0.3 to 1 part by weight of (2) oligomers of cyclopentadiene, washing the polymerized hydrocarbon mixture with aqueous isopropanol solution, and finishing the polymerizate to provide a petroleum resin having a softening point of about 140° C. to about 160° C.

DETAILED DESCRIPTION OF THE INVENTION

As set forth above the high softening point resins are obtained by a process which comprises polymerizing with an aluminum chloride catalyst a mixture of one part of an aromatic feedstock with a mixture of dicyclopentadiene, an alkyl cyclopentadiene dimer, a codimer of cyclopentadiene with an alkyl cyclopentadiene, a codimer of cyclopentadiene or an alkyl cyclopentadiene with a $C_4$ to $C_6$ acyclic olefins and diolefin or a mixture of said dimers and codimers. These dimers and codimers are produced during the thermal Diels Alder reaction of feedstocks containing conjugated cyclic diolefin and acyclic $C_4$ to $C_6$ olefins and diolefins, as for example cyclopentadiene and alkyl cyclopentadiene as well as isoprene or pentadienes-1,3.

The vinyl aromatic feedstock has a composition which is 3 to 10 wt. % styrene, 2 to 6 wt. % α-methyl styrene, 15 to 25 wt. % vinyl toluene, 10 to 18 wt. % indene and 4 to 12 wt. % methyl indenes, thus it be described as containing styrene and its derivatives and indene and its derivatives and is obtained by steam cracking petroleum refinery streams and separating the fraction boiling in the range of 135° and 220° C.

The second component of the mixture to be polymerized are the dimers and codimers of cyclopentadiene and alkyl cyclopentadienes as well as the codimer of each of these with acyclic $C_4$ to $C_6$ olefins and diolefins. The dimers or codimers are obtained from the heat soaking process mentioned above. Usually, the alkyl cyclopentadiene is methyl cyclopentadiene and usually this stream comprises both dicyclopentadiene and methylcyclopentadiene dimer which are formed by thermal oligomerization. This stream which is subjected to thermal oligomerization, usually has a boiling range of from 20° to 220°, e.g. 30° to 180° C.

The oligomer containing stream comprises the following: a 0.5 to 6 wt. % butadiene-cyclopentadiene codimer, 2 to 8 wt. % isoprene-cyclopentadiene codimer, 25 to 40 wt. % dicyclopentadiene, 3 to 10 wt. % piperylene cyclopentadiene codimer, 25 to 40 wt. % cyclopentadiene methylcyclopentadiene codimer and 2 to 8 wt. % methylcyclopentadiene dimer.

The two components of the mixture, i.e. the aromatic feedstock and the oligomer containing stream are mixed in a weight ratio of between 1:1 and 1:9 which provide polymers having vinyl aromatics/indenes/cyclic dimers, codimers molar ratios ranging from about 0.5/0.4/1 to 3/3/1, respectively. Preferably the feed weight ratios vary from 1:4 and 1:2, which provide polymers having vinyl aromatics/indenes/cyclic dimers, codimers molar ratios ranging from about 1.4/1.9/1.0 to 1.0/0.8/1.0, respectively.

The resin feedstock mixture may be polymerized in a conventional manner with conventional aluminum chloride catalyst. The polymerizations can be run either batch wise or continuous.

It is also advantageous to use a non-reactive diluent in the reactor to reduce the polymerizate viscosity and minimize the sludge build-up on the reactor walls. The diluent can be used in concentrations of 0 to 30%, but preferably about 10%, by weight.

In batch runs the aluminum trichloride is added to the stirred resin feedstock under an inert atmosphere. The usual catalyst concentrations are in the range of 0.2 to 5 weight percent and preferably 0.3 to 1.7 weight percent based on the resin feedstock. The resin feedstock is adjusted to the polymerization temperature of about 0° to 60° C. and maintained at that temperature the prescribed length of time. The preferred conditions using aluminum chloride as the catalyst is 1.0 percent catalyst for a reaction temperature of 40° C. for a period of about 1 to 2 hours.

In the continuous runs, catalyst and resin feedstock are added to a stirred reactor maintained at the polymerization temperature under an inert atmosphere. The concentration of aluminum chloride catalyst is usually in the range of 0.3 to 3 and preferably 0.7 to 1.25 by weight with the temperatures of the reactor at 0° to 60° C. The most suitable feed addition rate gives an approximate residence time of 0.3 to 2.0 hours.

The resultant resin mixture is then quenched with an aqueous isopropanol solution to destroy the catalyst, washed and finished to produce a high softening point resin of from 140° C. to 160° C.

Although the specific range in feedstock composition of 0.3–1:1, taught to be highly useful in the process of the invention, one skilled in the art can most likely expand it by the appropriate combination of feedstock ratio, feed diluent catalyst concentration, reaction temperature and residence time.

This high softening point resin may be emulsified by dissolving it in a hydrocarbon solvent such as toluene, and adding this mixture to water containing an emulsifier, such as an alkylaryl polyether alcohol. The resultant emulsion may then be stripped to remove the solvent.

The invention can be further illustrated by the following examples, although it will be understood that these examples are included merely for purposes of illustration and are not intended to limit the scope of the invention unless otherwise specifically indicated.

EXAMPLE 1

The cyclopentadiene oligomeric stream and the aromatic stream shown on Table 1 are blended in a 1:1 ratio and diluted by 10% with a mixture of non-reactive hydrocarbons. This feed blend is continuously pumped into the reactor under a nitrogen blanket, thoroughly agitated, and held at a temperature of 45° C. The $AlCl_3$ catalyst is continuously added to the reactor at a 1.0% level based on the weight of the feedstock.

The catalyst in the reactor polymerizate is quenched in a water-isopropanol solution and the polymerizate is subsequently washed with water. The resin is finished by steam stripping at 250° C. The finished resin softening point was 1550° C. and the Gardner color was 14½.

TABLE 1

| | |
|---|---|
| Butadiene-cyclopentadiene codimer | 1.64 |
| Styrene | 1.63 |
| Isoprene-cyclopentadiene codimer | 4.61 |
| Dicyclopentadiene dimer | 32.63 |
| $C_5$ Diolefin-cyclopentadiene codimer | 5.99 |
| $C_5$ Diolefin-methylcyclopentadiene codimer | |
| Cyclopentadiene-methylcyclopentadiene codimer | 31.64 |
| Methylcyclopentadiene codimer | 5.74 |
| Styrene | 7.28 |
| α-Methylstyrene | 3.65 |
| Vinyl toluene | 20.80 |
| Indene | 13.59 |
| Methyl indenes | 8.50 |

EXAMPLE 2

The cyclopentadiene oligomeric stream and the aromatic stream shown on Table 2 are blended in a 1:2 ratio and diluted as described in example 1. This continuous reaction is run at 50° C. and the catalyst concentration is 0.7% based on the weight of the feed. After quenching, washing and finishing as described in example 1, the resultant resin had a softening point of 142° C. and a Gardner color of 13.

TABLE 2

| | |
|---|---|
| Butadiene-cyclopentadiene codimer | 1.77 |
| Styrene | 1.38 |
| Isoprene-cyclopentadiene codimer | 4.86 |
| Dicyclopentadiene dimer | 37.63 |
| $C_5$ Diolefin-cyclopentadiene codimer | 5.88 |
| $C_5$ Diolefin-methylcyclopentadiene codimer | |
| Cyclopentadiene-methylcyclopentadiene codimer | 30.55 |
| Methylcyclopentadiene codimer | 4.40 |
| Styrene | 8.80 |
| α-Methylstyrene | 4.00 |
| Vinyl toluene | 22.72 |
| Indene | 14.73 |
| Methyl indenes | 7.30 |

EXAMPLE 3

The high softening point resin is emulsified by dissolving 140 grams of it in 75 grams of toluene and mixing this solution with a solution of 215 grams water and 7 grams of Triton X-100, using a Silverson heavy duty laboratory mixer emulsifier. The mixer is run at full speed while the resin/toluene solution is slowly added to the water/emulsifier solution and is run an additional 10 minutes after the resin toluene solution is added. The container in which the mixing is being done is kept in an ice bath during the mixing to hold the temperature at about 35° C. and below 40° C. The subsequent emulsion is vacuum stripped using a rotary stripper at about 65° C. The resultant emulsion had a solids content of 59.1% and an average particle size of 1 to 2 microns.

What is claimed is:

1. A process for preparing a high softening point resin which comprises polymerizing in the presence of at least a catalytic amount of aluminum chloride, an unsaturated hydrocarbon feedstock mixture in the ratio of: one part by weight of (1) a vinyl aromatic stream having a boiling range of from 135° to 220° C. and which comprises from 3% to 10% styrene, from 2% to 6% α-methyl styrene, from 15% to 25% vinyl tolune, from 10% to 18% indene and from 4% to 12% methyl indenes; and from 0.3 to 1 part by weight of (2) oligomers of a cyclopentadiene stream which comprises 0.5 to 6 wt.% butadienecyclopentadiene, 2 to 8wt.% isoprene-cyclopentadiene codimer, 25 to 40wt.% dicyclopentadiene, 3 to 10wt.% piperylene-cyclopentadiene codimer, 25 to 40 wt.% cyclopentadiene-methylcyclopentadiene codimer and 2 to 8 wt.% methylcyclopentadiene dimer; (b) quenching said polymerized hydrocarbon feedstock mixture to remove catalyst residues; and (c) finishing the washed polymerizate to provide a petroleum resin having a softening point of about 140° C. to about 160° C.

2. The process according to claim 1 wherein said aluminum chloride concentration ranges from 0.3 to 3.0 weight percent based on the total weight of the mixture and the polymerization is at a temperature of from 0° to 60° C.

3. The process according to claim 2 wherein the polymerization is continuous with a reaction residence time of from 0.05 to 2 hours.

4. The process according to claim 1 wherein the polymerization is batch and the aluminum chloride concentration ranges from 0.2 to 5.0 weight percent based on the total weight of the mixture and the polymerization is at a temperature of from 0° to 60° C. and is maintained for a period of 1 to 2 hours.

5. The process according to claim 1 wherein said polymerizing is batch and said aluminum chloride concentration ranges from 0.2 to 5.0 weight percent based on the total weight of the feedstock and said polymerizing is at a temperature of from 0° to 60° C. and for a period of one to two hours.

6. A high softening point petroleum resin prepared by a process which comprises
   (a) polymerizing in the presence of at least a catalytic amount of aluminum chloride, an unsaturated hydrocarbon feedstock mixture in the ratio of: one part by weight of (1) a vinyl aromatic stream having a boiling range of from 135° to 220° C. and which comprises from 3% to 10% styrene, from 2% to 6% α-methyl styrene, from 15% to 25% vinyl toluene, from 10% to 18% indene and from 4% to 12% methyl indenes; and from 0.3 to 1 part by weight of (2) oligomers of a cyclopentadiene stream which comprises 0.5 to 6 wt.% butadiene-cyclopentadiene, 2 to 8 wt.% isoprene-cyclopentadiene codimer, 25 to 40wt.% dicyclopentadiene, 3 to 10 wt.% piperylene-cyclopentadiene codimer, 25 to 40 wt.% cyclopentadiene-methylcyclopentadiene codimer, and 2 to 8 wt.% methycyclopentadiene dimer;
   (b) quenching said polymerized hydrocarbon feestock mixture with a water/isopropanol solution and thereafter washing it with water; and, (c) finishing the washed polymerizate to provide a petroleum resin having a softening point of about 140° C. to about 160° C. and a styrenes/indenes/oligomers molar ratio ranging from 0.5/0.4/1 to 3/1/1, respectively.

7. The resultant polymer according to claim 6 wherein said molar ratio ranges from 1.4/1.9/1.0 to 1.0/0.8/1.0, respectively.

* * * * *